US007914065B2

(12) United States Patent
Sugawara

(10) Patent No.: US 7,914,065 B2
(45) Date of Patent: Mar. 29, 2011

(54) OPENING AND CLOSING DEVICE

(75) Inventor: Koichi Sugawara, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 304 days.

(21) Appl. No.: 12/135,625

(22) Filed: Jun. 9, 2008

(65) Prior Publication Data

US 2008/0313965 A1 Dec. 25, 2008

(30) Foreign Application Priority Data

Jun. 21, 2007 (JP) ................................. 2007-164073

(51) Int. Cl.
*B60J 1/12* (2006.01)

(52) U.S. Cl. .................. 296/146.2; 296/223; 296/146.4; 49/31

(58) Field of Classification Search ............... 296/24.34, 296/155, 146.4, 146.2, 223, 97.4; 49/31, 49/502; 160/1, DIG. 2, DIG. 3
See application file for complete search history.

(56) References Cited

U.S. PATENT DOCUMENTS

| | | | | |
|---|---|---|---|---|
| 4,674,230 | A * | 6/1987 | Takeo et al. | 49/32 |
| 7,030,509 | B2 * | 4/2006 | Okada et al. | 307/10.1 |
| 7,216,917 | B2 * | 5/2007 | Tadakamalla | 296/97.4 |
| 2008/0302014 | A1 * | 12/2008 | Szczerba et al. | 49/31 |
| 2009/0302637 | A1 * | 12/2009 | Iijima | 296/155 |
| 2010/0032993 | A1 * | 2/2010 | Yoshida et al. | 296/223 |
| 2010/0102598 | A1 * | 4/2010 | Frey et al. | 296/223 |

FOREIGN PATENT DOCUMENTS

| | | |
|---|---|---|
| JP | 2000-240352 | 9/2000 |
| JP | 2003-155871 | 5/2003 |

* cited by examiner

*Primary Examiner* — Jason S Morrow
(74) *Attorney, Agent, or Firm* — Brinks Hofer Gilson & Lione

(57) ABSTRACT

An opening and closing device opens and closes a shielding body that partitions space by the operation of an operating unit in a range between a fully opened position and a fully closed position. The opening and closing device includes a limit setting unit, a control unit, and an operating element. The limit setting unit can perform an operation for setting an operational limit position of the shielding body. The control unit sets a range, where the shielding body can be opened and closed by the operation of the operating unit, as a predetermined range between the set operational limit position and a fully closed position or between the set operational limit position and a fully opened position. The operating element operates the control unit so that the range where the shielding body is opened and closed is set to the predetermined range.

2 Claims, 3 Drawing Sheets

FIG. 3

| CHILD LOCK | P/W LOCK | MANUAL RAISING OPERATION | MANUAL LOWERING OPERATION | AUTOMATIC RAISING OPERATION | AUTOMATIC LOWERING OPERATION |
|---|---|---|---|---|---|
| OFF | OFF | AVAILABLE | AVAILABLE | AVAILABLE | AVAILABLE |
| OFF | ON | UNAVAILABLE | UNAVAILABLE | UNAVAILABLE | UNAVAILABLE |
| ON | OFF | AVAILABLE | LIMITED | AVAILABLE | LIMITED |
| ON | ON | UNAVAILABLE | UNAVAILABLE | UNAVAILABLE | UNAVAILABLE |

OPENING AND CLOSING DEVICE

CROSS REFERENCE TO RELATED APPLICATIONS

The present invention contains subject matter related to Japanese Patent Application JP 2007-164073 filed in the Japanese Patent Office on Jun. 21, 2007, the entire contents of which is incorporated herein by reference in its entirety.

BACKGROUND

1. Technical Field

The present invention relates to an opening and closing device that opens and closes a shielding body, such as a power window, a slide door, a sunroof, or an automatic rear door, provided in a vehicle by the operation of an operating unit, and more particularly, to an opening and closing device that can arbitrarily set an opening and closing range of a shielding body.

2. Related Art

In the past, a power window device, a slide door device, a sunroof device, an automatic rear door device, and the like have been known as opening and closing devices provided in a vehicle. In the case of the power window device, a power window provided in a door of a vehicle is used as a shielding body that partitions space. In the case of the slide door device, a slide door provided on the side of a vehicle is used as a shielding body that partitions space. In the case of the sunroof device, a sunroof provided on the top of a vehicle is used as a shielding body that partitions space. In the case of the automatic rear door device, a rear door provided at the rear of a vehicle is used as a shielding body that partitions space. Further, the shielding body can be driven to be opened and closed by the operation of an operating unit provided in a vehicle cabin. For example, an opening and closing device serving as a power window device is disclosed in Japanese Unexamined Patent Application Publication No. 2003-155871.

SUMMARY

In these opening and closing devices, it is possible to fully open or close the shielding body by continuing to operate the operating unit or performing a predetermined operation of the operating unit. Further, when the shielding body needs to be stopped at a position between a fully opened position and a fully closed position, it was necessary to pay attention in every operation. For this reason, for example, when the shielding body needs to be open and closed in a range where pinching does not occur, that is, in a range from the fully opened position to a predetermined position, or when the shielding body needs to be open and closed in a range where an object or a person does not come down through a window, that is, in a range from the fully closed position to a predetermined position, it was necessary to operate the shielding body while paying attention.

A case where a sunroof needs to be open and closed in a range where a child cannot pop one's body out of the sunroof, a case where a slide door needs to be open and closed in a range where the pet cannot escape, and the like are considered as a case where the shielding body needs to be open and closed in the range from the fully closed position to a predetermined position. In the case of a vehicle where a door cannot be unlocked by an operation in a vehicle cabin, a so-called vehicle including a child lock switch, the operation of the power window needed to be also limited during the child locking state. The reason for this is as follows: in general, even though a child lock switch is turned on, it is possible to open the door from the outside of the vehicle. Therefore, even though the child lock switch is turned on, it is possible to open the door by fully opening the power window, reaching out from the inside of the vehicle to the outside of the vehicle, and operating a door knob provided on the outer portion of the vehicle in order to release the locking of the door.

An advantage of some aspects of the invention is to provide an opening and closing device where an operator can freely set an operable range of a shielding body.

According to an aspect of the invention, an opening and closing device opens and closes a shielding body that partitions space by the operation of an operating unit in a range between a fully opened position and a fully closed position. The opening and closing device includes a limit setting unit, a control unit, and an operating element. The limit setting unit can perform an operation for setting an operational limit position of the shielding body. The control unit sets a range, where the shielding body can be opened and closed by the operation of the operating unit, as a predetermined range between the set operational limit position and a fully closed position or between the set operational limit position and a fully opened position. The operating element operates the control unit so that the range where the shielding body is opened and closed is set to the predetermined range.

BRIEF DESCRIPTION OF THE DRAWINGS

FIG. 3 is a view showing that the operation of the other seat window operating switch is available or unavailable in accordance with the operation of a child lock switch and a window lock switch.

DESCRIPTION OF EXEMPLARY EMBODIMENTS

Figure 1:
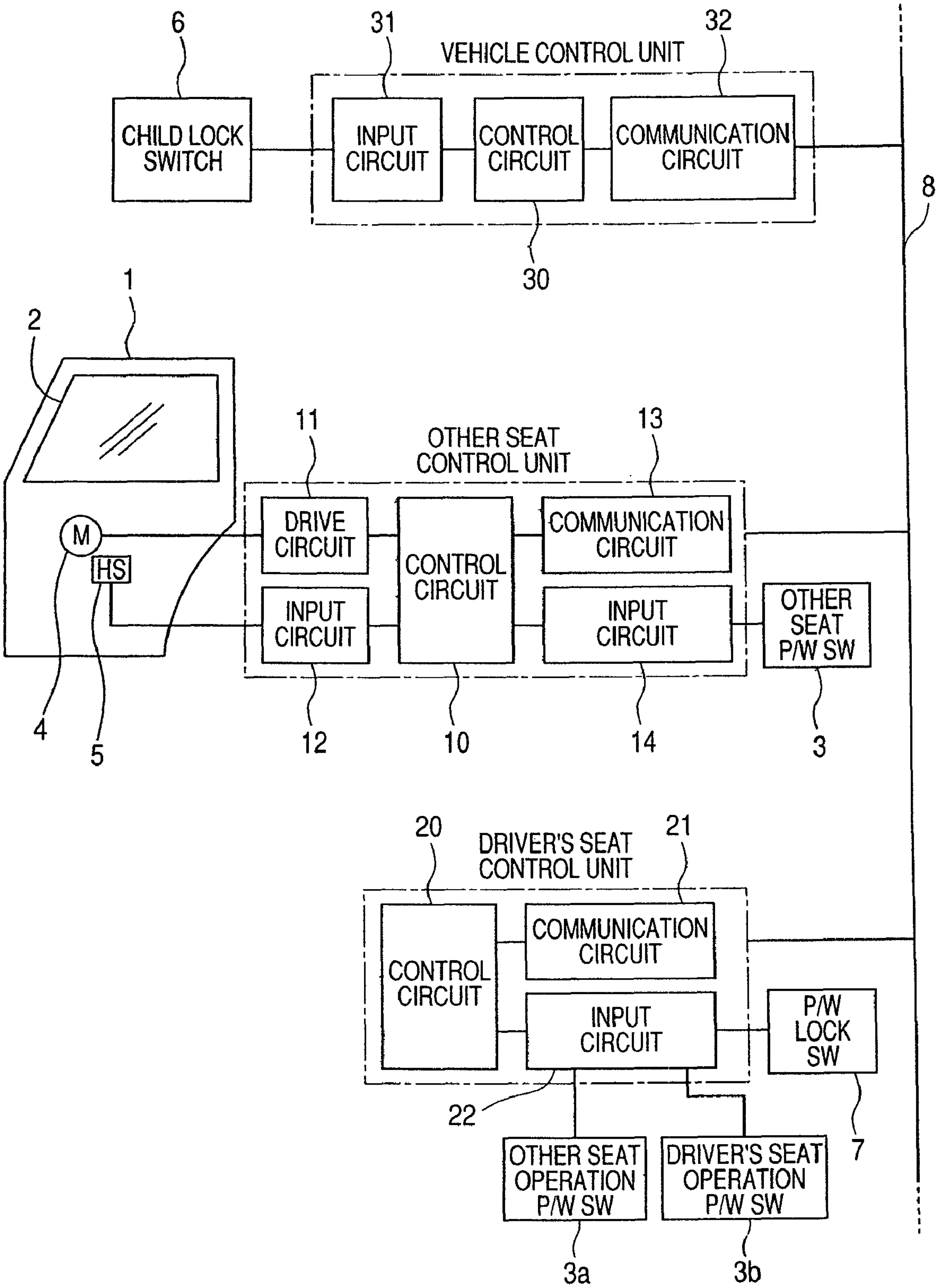
FIG. 1 is a block diagram of an opening and closing device according to an embodiment.

An embodiment will be described in detail with reference to drawings. In this embodiment, a power window device used as an opening and closing device to which the invention is applied will be described. FIG. 1 shows a block diagram of an opening and closing device according to this embodiment. In the opening and closing device according to this embodiment, a window 2 provided in a door 1 of a vehicle is used as a shielding body that partitions space, and is driven to be closed or opened between a fully opened position and a fully closed position by the operation of an other seat window operating switch 3 provided as an operating unit.

According to this embodiment, a driver's seat operation power window switch **3*b*, other seat operation power window switches 3*a*, a child lock switch 6, and a power window lock switch 7 are provided near the driver's seat. The driver's seat operation power window switch is used to operate a window provided in a door of a driver's seat. The other seat operation power window switches (in FIG. 1, only one other seat operation power window switch is shown and the rest of the other seat operation power window switches are omitted because other seat operation power window switches are the same) are used to operate windows provided in doors near other seats, such as a passenger seat and rear seats, except for the driver's seat. The child lock switch makes doors of other seats except the driver's seat be locked not to be released. The power window lock switch prevents the operation of the power windows of other seats except for the driver's seat. The child lock switch 6 functions as both a limit setting unit that sets an operating range of a window 2 as described below, and an operating element that enables the setting thereof and makes a control unit 10 open and close the door 1** within a predetermined range.

Further, other seat power window switches 3, which are used to operate windows provided in the doors corresponding to the other seats, such as the passenger seat and the rear seats, except for the driver's seat, are provided near the seats, respectively. Further, in FIG. 1, only one other seat is shown, and the rest of the seats are omitted because other seats are the same. The door 1 corresponding to the other seat is provided with a motor 4 that drives the window 2, and a rotation sensor 5 that detects the rotation of the motor 4. Since the rotation sensor 5 detects the rotation amount of the motor 4, it is possible to calculate the position of the window 2. Meanwhile, the same mechanism is also provided at the driver's seat. However, since being the same, the mechanism is omitted in the drawing.

Each other seat control unit is provided as the structure that drives the motor 4 by the operation of the other seat window operating switch 3. As shown in FIG. 1, the other seat control unit includes a control circuit 10 that controls each of the parts; a drive circuit 11 that drives the motor 4 on the basis of the control of the control circuit 10; an input circuit 12 that receives a signal from the rotation sensor 5 and outputs the signal to the control circuit 10; a communication circuit 13 that performs communication between the other seat control unit and other devices in a vehicle; and an input circuit 14 that receives a signal generated by the operation of the other seat window operating switch 3 and outputs which one of operation time and an opening or closing signal is input to the control circuit 10.

The control circuit 10 provided at the other seat is connected to an in-vehicle communication network 8 through the communication circuit 13. A driver's seat control unit that is provided at the driver's seat, a vehicle control unit that controls each of devices in a vehicle, and the like are connected to the in-vehicle communication network 8. Further, although not shown, various devices that are provided in the vehicle, such as devices that lock the doors, are connected to the in-vehicle communication network 8.

The driver's seat power window switch 3*b*, the other seat operation power window switch 3*a*, and the window lock switch 7 are connected to the driver's seat control unit. The driver's seat control unit includes a control circuit 20 that controls each of the parts, a communication circuit 21 that performs communication between the control circuit 20 and other devices in the vehicle, and an input circuit 22. The input circuit receives signals generated by the operation of the driver's seat power window switch 3*b*, the other seat operation power window switch 3*a*, and the window lock switch 7, and outputs the signals to the control circuit 20.

Further, the vehicle control unit, which controls each of devices in the vehicle, includes a control circuit 30 that controls each of the parts, a communication circuit 32 that performs communication between the control circuit 30 and other devices in the vehicle, and an input circuit 31 that receives a signal generated by the operation of the child lock switch 6 and outputs the signal to the control circuit 30. Meanwhile, although not shown, other structures for controlling other devices are further provided in the vehicle control unit.

When both the child lock switch 6 and the window lock switch 7 provided near the driver's seat are turned off, if the other seat window operating switch 3 provided at the other seat is operated, the control circuit 10 makes the drive circuit 11 drive the motor 4 and can operate the window 2 of the door 1 in the range between a fully opened position where the window is fully opened and a fully closed position where the window is fully closed.

The other seat window operating switch 3 can perform four kinds of operation, such as a manual raising operation that continues to raise the window 2 by the continuous operation, a manual lowering operation that continues to lower the window 2 by the continuous operation, an automatic raising operation that automatically continues to raise the window 2 by the once operation, and an automatic lowering operation that automatically continues to lower the window 2 by the once operation.

If the child lock switch 6 provided at the driver's seat, which has been turned off, is turned on, the control circuit 30 operates a door lock mechanism (not shown) in order to lock the door so that the door is not opened in a vehicle cabin. Further, a fact that the child lock switch 6 is turned on is transmitted to door lock control units (not shown) of other seats through the in-vehicle communication network 8, and doors are locked at other seats and controlled so that the locking of the doors is not released in the vehicle cabin.

If the window lock switch 7 provided at the driver's seat that has been turned off is turned on, even though the driver's seat operation power window switch 3*b* and the other seat operation power window switch 3*a* are operated, the control circuit 20 does not receive this. That is, the opening and closing of the window of the driver's seat are prevented, and this information is transmitted to the other seat control unit through the in-vehicle communication network 8 so that the windows provided in the doors of other seats cannot be opened and closed. Even though the other seat window operating switch 3 is operated, the other seat control unit, which has received the information that the window lock switch 7 is turned on, does not open or close the windows 2 like the driver's seat control unit.

Figure 2A:
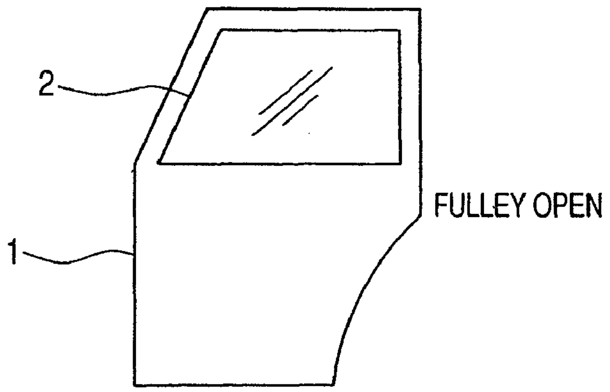
FIG. 2 is a view showing that a window of a door is operated.
Figure 2B:
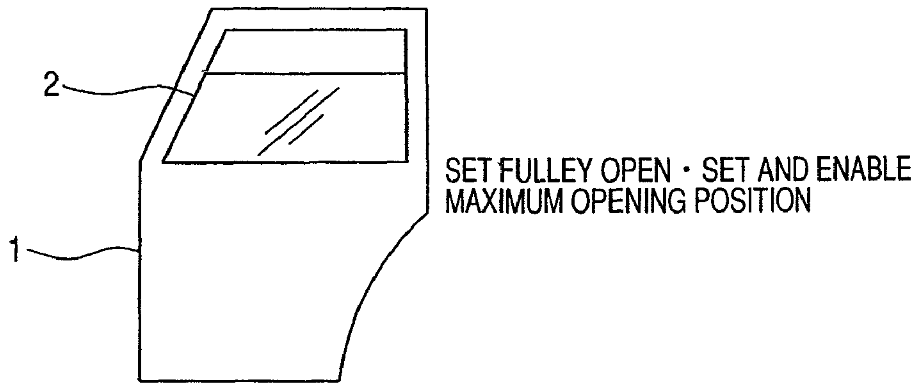

The opening and closing operation of the window 2, when the child lock switch 6 is operated, will be described below. FIG. 2 is a view showing that the window 2 of the door 1 is operated. FIG. 2A shows the fully open state of the window 2. FIG. 2B shows a state where the window is lowered from this state by the manual or automatic lowering operation of the other seat window operating switch 3 or the other seat operation power window switch 3*a* and is stopped at a position between the fully opened position and the fully closed position. If the child lock switch 6, which has been turned off, is turned on in the state of FIG. 2B, this information is transmitted to the other seat control unit through the in-vehicle communication network 8 as described above.

Figure 2C:
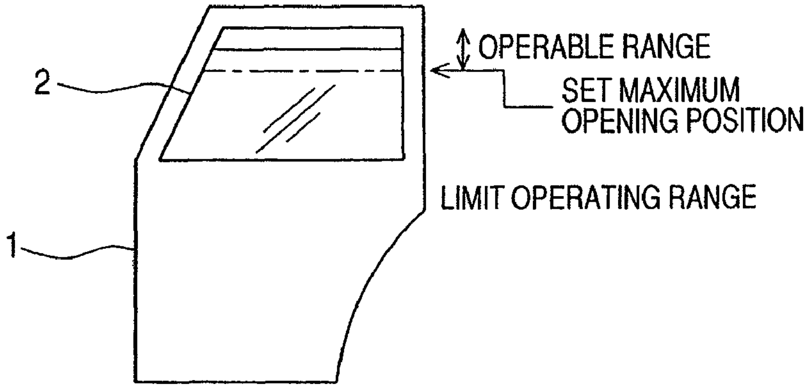

The control circuit 10 of the other seat control unit, which has received the information that the child lock switch 6 is turned on, calculates the position of the window 2 at that time on the basis of the information from the rotation sensor 5, and stores the position. Accordingly, a position where the window can be opened to the maximum extent is set in the control circuit. Further, the control of the drive circuit 11 based on the set value is enabled by the control circuit 10, and the window 2 is operated between the maximum opening position and the fully closed position. After that, when the other seat window operating switch 3 or the other seat operation power window switch 3*a* is operated while the child lock switch 6 is turned on, the control circuit 10 performs control so that the window 2 is operated to be opened or closed only in the range between the fully closed position and the set maximum opening position as shown in FIG. 2C. Meanwhile, the child lock switch 6 is set like the conventional child lock so that an unlock switch for a door provided in a vehicle cabin cannot be operated or the locking of the door cannot be released even if the unlock switch is operated.

FIG. 3 is a view showing that power windows of other seats except for the driver's seat is operated, and is a view showing whether the other seat window operating switch 3 is available or unavailable according to the operation of the child lock switch 6 and the window lock switch 7, which is controlled by the control circuit 10. As shown in FIG. 3, when the window lock switch 7 is turned on, the operation of the window 2 is unavailable regardless of whether the child lock switch 6 is turned on or off. Meanwhile, whether the operation of the other seat operation power window switch 3*a* is available or unavailable is also the same as whether the other seat window operating switch 3 is available or unavailable.

When the window lock switch 7 is turned off, the operation of the window 2 is available without limitation if the child lock switch 6 is turned off. Meanwhile, when the window lock switch 7 is turned off and the child lock switch 6 is turned on, the manual raising operation and the automatic raising operation are available but the manual lowering operation and the automatic lowering operation are available only if the window 2 is in a predetermined range. That is, if the window 2 is lowered to the set maximum opening position by the manual lowering operation or the automatic lowering operation, the window cannot be lowered any more. Specifically, if the child lock switch 6 is turned on, while the child lock switch is turned on, a signal representing that the operation is performed is input to the control circuit 10 through the control circuit 30, the communication circuit 32, the in-vehicle communication network 8, and the communication circuit 13. In this case, the position of the window 2 is detected by detecting the rotation amount of the motor 4 by the rotation sensor 5 input to the input circuit 12 at a time where a signal is initially input, that is, at a time where an OFF state is changed into an ON state. Then, a limit position is set by storing the position of the window in a memory. After that, if the other seat power window lock switch 3 is operated, the control circuit 10 calculates the current position of the window by the rotation sensor 5. While an ON signal of the child lock switch 6 is input, the control circuit 10 determines whether the position of the window is a position corresponding to a predetermined range, that is, a position closer to the fully closed position than the above-mentioned position stored in the memory. Then, if the position of the window is the position closer to the fully closed position than the above-mentioned position stored in the memory, the control circuit performs control so that the motor is driven. Further, if the window reaches a predetermined position, the control circuit performs control so that the motor is stopped.

Meanwhile, there is a problem in that a closing operation cannot be performed only by this determination when the window 2 is positioned at the set position. However, the motor is driven when the closing operation is detected at the position, and the motor is not driven when an opening operation is detected, which makes it possible to solve this problem. There may be another method that determines whether the window is positioned at a predetermined position only when the opening operation is performed, and drives the motor so that the window is closed regardless of the position during the closing operation.

On the other hand, since the window can be raised up to the fully closed position of the window 2, the manual raising operation and the automatic raising operation are not limited. In addition, the detection of the fully closed position may be detected by the rotation sensor 5, may be detected by detecting the increase of current flowing in the motor, or may be detected by a known method using a detection switch and the like.

As described above, the position of the window 2 at that time is set to the maximum opening position by operating the child lock switch 6, which is a limit position setting unit. After that, the other seat control unit is controlled so that the window 2 can be opened or closed only in the range between the set position and the fully closed position, which makes it possible to arbitrarily set a range where the window 2 can be opened and closed by operating the child lock switch 6. Therefore, when the window 2 is required to be opened only in the range where an object or a person does not come down through the opened window 2, it is possible to achieve this by a simply operation. Further, the child lock switch 6 is used as a limit setting unit and turned on so that the door 1 is not opened in a vehicle cabin. Then, it is possible to make the window 2 be opened only up to a predetermined position. For this reason, if a predetermined position where a hand does not reach a door knob is set in the vehicle cabin, it is possible to prevent the door 1 from being opened by opening the window 2, reaching out to the outside of the vehicle, and operating the door knob outside the vehicle during the child locking state. Therefore, in this case, it is possible to ensure a child lock function.

In this embodiment, the other seat power window switch 3 has the functions of both the manual lowering operation and the automatic lowering operation. However, the seat power window switch may have only a function of a manual operation without a function of an automatic operation. Further, in this embodiment, the control circuit 10 receives a signal of the child lock switch 6 from the vehicle control unit, and determines whether a limit position is set and the setting of the limit position is available or not. However, information about the position of the window of each seat may be transmitted to the control circuit 30, and the control circuit 30 may transmit the information to the control circuit 10 so as to operate the window in a predetermined range only when the setting of the limit position is available.

In this embodiment, the child lock switch 6 has the functions of both a limit setting unit and an operating element. However, the child lock switch 6 may have only a function of a limit setting unit, and a separate switch may be provided as a member for enabling this setting of the limit. In this case, when the child lock switch 6 is turned on at a predetermined position of the window 2, the position of the window is stored and the locking cannot be released in a vehicle cabin. In this state, the control circuit 10 does not determine whether the position of the window is closer to the fully closed position than the set value of the limit, and the window can be operated an arbitrary position between the fully open state and the fully closed state. However, a separate switch is pressed, so that the set value initially becomes available. After the set value becomes available, it is determined whether the position of the window is closer to the fully closed position than the set value of the limit. Then, when the other seat power window switch 3 is operated, the window 2 is moved between the set position and the fully closed position. Further, it may be considered that a separate switch is pressed while the window is positioned below the set position. However, in this case, until the window is operated, the control circuit 10 may not determine whether the position of the window is in a predetermined range between the set position and the fully closed position, that is, may perform a process that does not enable the setting of the limit.

In addition, switches other than the child lock switch 6 may be used as the limit setting unit and the operating unit. For example, when an operation for repeating turning on and off the window lock switch 7 is continuously performed 5 times within 10 seconds, the position of the window 2 at that time may be set to the fully opened position and the setting of the position may be enabled. Further, other switches such as audio switches may be used, and an independent switch may be provided as the limit setting unit.

Further, in this embodiment, the child lock switch 6 is used to input a signal of the switch to the input circuit 31 so that the door is locked and the locking of the door cannot be released or the limit is set and the setting of the limit is enabled. However, a switch to be operated by the operating unit may be newly provided in a vehicle where the locking of a door is controlled by mechanically operating an operating unit, and a limit may be set and the setting of the limit may be enabled by the switch.

Furthermore, in this embodiment, the maximum opening position is set and the window 2 can be opened or closed between the set position and the fully closed position. However, alternatively, the maximum closed position may be set by the limit setting unit and the window 2 may be opened or closed between the set position and the fully opened position. In this case, it is possible to make the window 2 be capable of being opened or closed in the range where pinching does not occur. It may be predetermined whether the limit position set by the limit setting unit is used as the maximum opening position or the maximum closed position. Alternatively, a separate switch may be provided so as to switch the maximum opening position and the maximum closed position. In this case, the maximum opening position and the maximum closed position may be set using the separate switch. In this case, which one of the positions is set is selected by an identification switch, the value of each operation limit is set by the child lock switch 6, and the setting thereof is enabled by a separate switch. Further, after a fact that the window 2 is positioned in this range is detected, a predetermined range determination is performed. If being out of the range, the window may be stopped. Only when an opening operation is instructed at a closing limit position and a closing operation is instructed at an opening limit position, the subsequent operation may be performed so that the window 2 is operated.

The embodiment of the invention has been described above. However, the application of the invention is not limited to this embodiment, and the invention may be applied in various ways without departing from the scope of the invention. For example, in this embodiment, the invention is applied to a power window device used as an opening and closing device. However, a slide door device, a sunroof device, and an automatic rear door other than the power window device may be applied as the opening and closing device. In this case, a basic method is the same as described above in that a predetermined position is set using a switch, a motor, and a sensor that are used to open and close a shielding body, and the shielding body is driven in a predetermined range between the set position and a fully opened or closed position. Therefore, the detailed description thereof will be omitted.

If the invention is applied to a slide door device, a shielding body is a slide door and an opening and closing switch thereof is the operating unit. Further, the child lock switch may be used as the limit position setting unit and the operating unit, like in the case of the power window device. Accordingly, when a pet is in a vehicle, it is possible to open and close the window during the parking in a range where the pet cannot escape. A push-pull switch is generally used as the operating unit of the slide door device. However, even though the pet touches the push-pull switch and the slide door is thus abnormally operated, the slide door is opened only up to a predetermined position. Therefore, it is possible to improve safety.

If the invention is applied to a sunroof device, a shielding body is a sunroof and an opening and closing switch thereof is the operating unit. Further, the child lock switch may be used as the limit position setting unit and the operating unit, like in the case of the power window device. Accordingly, it is possible to open and close the sunroof in a range where a child cannot pop one's body out of the sunroof.

It should be understood by those skilled in the art that various modifications, combinations, sub-combinations and alterations may occur depending on design requirements and other factors insofar as they are within the scope of the appended claims of the equivalents thereof.

According to, an opening and closing device includes a limit setting unit that can perform an operation for setting an operational limit position of a shielding body, a control unit that sets a range where the shielding body is opened and closed by the operation of an operating unit as a predetermined range between the set operational limit position and a fully closed position or between the set operational limit position and a fully opening position, and an operating element that operates the control unit so that the range where the shielding body is opened and closed is set to the predetermined range. Therefore, the position of the shielding body, which is arbitrarily set by the limit setting unit, is set as the maximum opening position or the maximum closed position in an actual operation. Further, it is possible to open and close the shielding body only in the range between the position and a fully closed or opening position. As a result, it is possible to easily perform an operation for opening and closing the shielding body only in a predetermined range, and to improve operability.

Further, the shielding body is a power window, a slide door, a sunroof, or an automatic rear door that is provided in a vehicle, and the limit setting unit is formed of a switch provided in a vehicle. Therefore, it is possible to easily set an opening and closing range of the power window by the operation of the switch that is provided in a vehicle cabin.

Furthermore, the shielding body is a power window, and the switch that forms the limit setting unit is a child lock switch. Accordingly, when child lock is set, it is possible to also set an operating range of the window at the same time. Therefore, it is possible to prevent a door from being opened by fully opening the window, reaching out to the outside of the vehicle, and operating a door knob. As a result, it is possible to ensure the operation of the window for ventilation, and to further ensure a child lock function.

In addition, the operating element is a child lock switch. Therefore, it is possible to easily ensure a child lock function in terms of price and operability.

What is claimed is:

1. An opening and closing device that opens and closes a shielding body for partitioning space by the operation of an operating unit in a range between a fully opened position and a fully closed position, the opening and closing device comprising:

a limit setting unit that performs an operation for setting an operational limit position of the shielding body; and a control unit that sets a range where the shielding body is opened and closed by the operation of the operating unit as a predetermined range between the set operational limit position and a fully closed position or between the set operational limit position and a fully opened position;

wherein the limit setting unit operates the control unit so that the range where the shielding body is opened and closed is set to the predetermined range, wherein the shielding body is one of a power window, a slide door, a sunroof, or an automatic rear door that is provided in a vehicle, and the limit setting unit comprises a switch provided in a vehicle, and wherein the shielding body is a power window, and the switch is a child lock switch.

2. An opening and closing device that opens and closes a shielding body for partitioning space by the operation of an operating unit in a range between a fully opened position and a fully closed position, the opening and closing device comprising:

a limit setting unit that performs an operation for setting an operational limit position of the shielding body;

a control unit that sets a range where the shielding body is opened and closed by the operation of the operating unit as a predetermined range between the set operational limit position and a fully closed position or between the set operational limit position and a fully opened position; and an operating element that operates the control unit so that the range where the shielding body is opened and closed is set to the predetermined range, wherein the operating element is a child lock switch.

* * * * *